July 6, 1926.

G. H. WALKER 1,591,866

WARMING DEVICE

Filed June 2, 1924  2 Sheets-Sheet 1

George H. Walker, INVENTOR

BY Victor J. Evans ATTORNEY

WITNESS: Gerald Hennessy.

July 6, 1926.
G. H. WALKER
WARMING DEVICE
Filed June 2, 1924
1,591,866
2 Sheets-Sheet 2
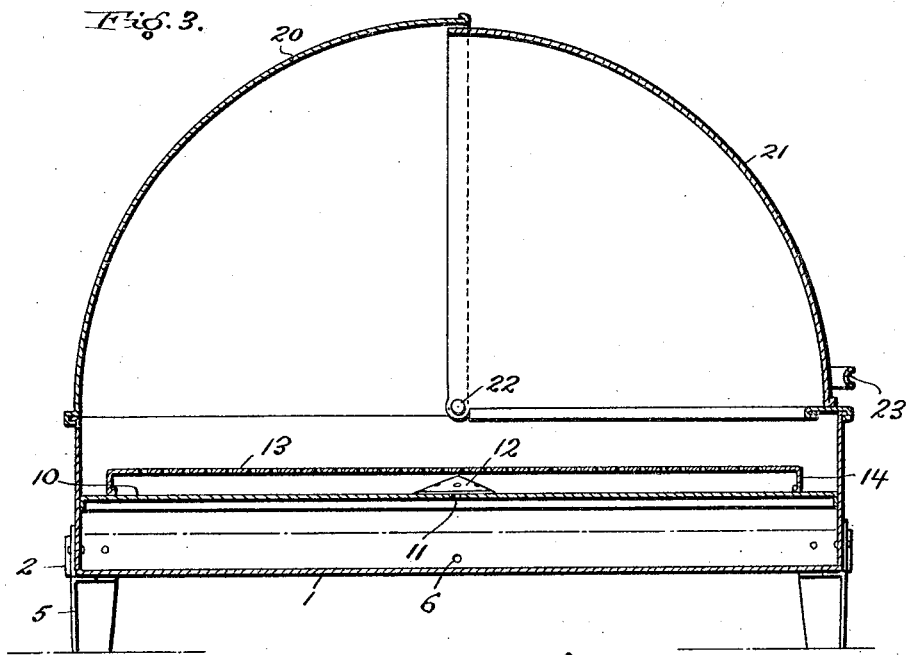
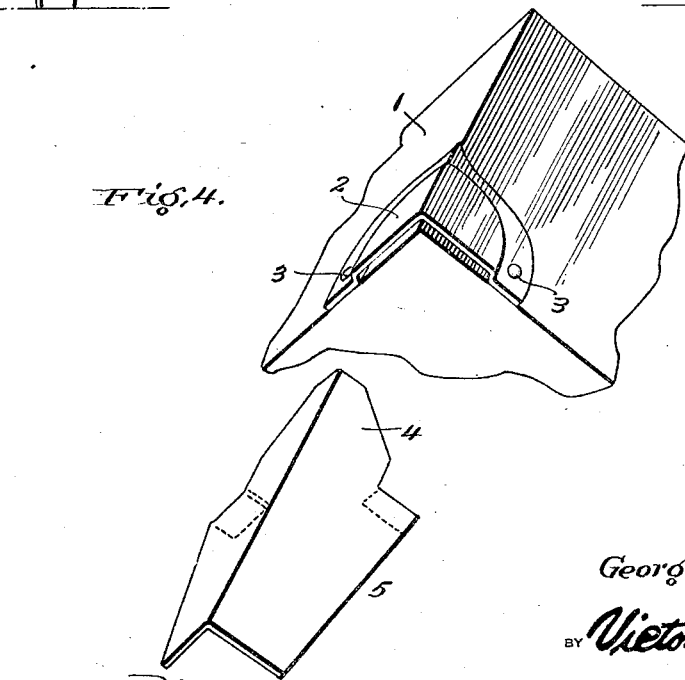
George H. Walker,
INVENTOR
BY Victor J. Evans
ATTORNEY
WITNESS: Gerald Hennessy Patented July 6, 1926.

1,591,866

UNITED STATES PATENT OFFICE.

GEORGE H. WALKER, OF HOT SPRINGS, ARKANSAS.

WARMING DEVICE.

Application filed June 2, 1924. Serial No. 717,395.

The object of my said invention is the provision of a simple and inexpensive device calculated to keep buns, biscuits and bread warm, and also calculated to subject the buns, biscuits or bread to the action of moist heated air with a view to restoring the freshness of the same.

To the attainment of the foregoing, the invention consists in the improvement as hereinafter described and definitely claimed.

In the accompanying drawings, forming part of this specification:—

Figure 3 is a longitudinal vertical section of the apparatus in closed state.

Figure 4 comprises disconnected perspectives of one detachable leg of the device and the body portion with which said leg cooperates when in use.

Similar numerals of reference designate corresponding parts in all the views of the drawings.

The major portion of my novel device is formed of sheet metal, by preference and among other elements the device comprises a hollow body 1, preferably of general rectangular configuration. At its corners said body 1 is provided with exterior socket members 2, riveted at 3 to the body, and designed and adapted to receive the shanks 4 of detachable legs 5, which legs 5 are of angular form in cross-section and are adapted to be disassociated from the body 1 when the device is not in use.

At this point I deem it proper for the sake of clearness to say that the said body 1 is adapted to be positioned over a gas burner or any proper proximity of steam or electric heating means so that the contents of the body will be heated by said means.

Figure 1:
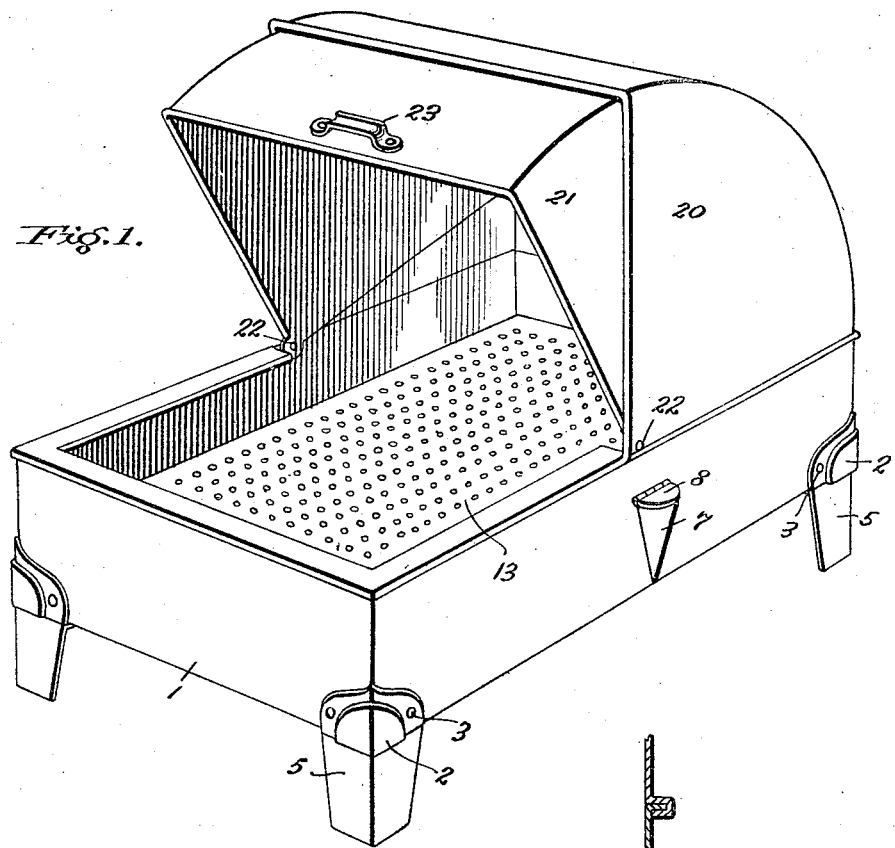
Figure 1 is a perspective showing my novel device as open.
Figure 2:
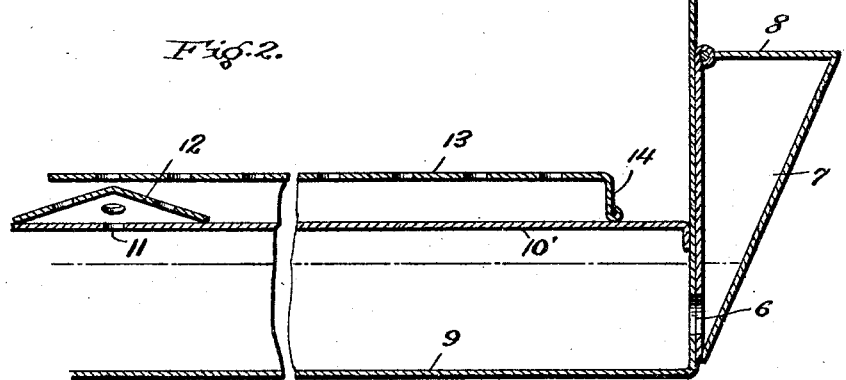
Figure 2 is an enlarged fragmentary vertical cross-section of a part of the apparatus.

The body 1 is adapted to contain water and is provided at 6 with an aperture for the entry of water the said aperture 6 being in connection with a filling conduit 7 at the outer side of the body 1, and the said conduit 7 being normally closed by a hingedly connected cover 8, Figures 1 and 2.

Appropriately fixed in the body 1 and spaced above the bottom 9 thereof is a false bottom 10. The said false bottom 10 is provided with an aperture 11 for the passage upward of steam from the body of water in the lower portion of the body, and over the said aperture 11 is arranged a conical and foraminous spreader 12 which may be and preferably is connected at its edge to the false bottom 10.

Superimposed upon the false bottom 10 of the body 1 and arranged within the said body 1 is a foraminous platform or support 13 on which are designed to be arranged the buns, biscuits or bread to be warmed. As shown the said platform 13 is provided with a marginal flange 14 which bears on the false bottom 10 as illustrated.

In addition to the elements enumerated my novel device comprises a cover. Said cover is made up of a hood 20 fixed with respect to the body 1 and a movable hood 21 relatively arranged as shown in Figures 1 and 3 and pivotally connected at 22 to the hood 20. The movable hood 21 is provided with a handle 23 whereby it may be moved from the partly open position shown in Figure 1 to the full closed position shown in Figure 3 and vice versa.

Manifestly when my novel device is arranged in proper proximity to a heating means, and the body 1 is charged with water, and the hood 21 is closed after the placing of buns, biscuits or bread on the platform 13, the buns, biscuits or bread will be maintained in a heated state and at the same time because of the steam supplied through the platform 13, the buns, biscuits or bread when hard and stale will be restored to a moist condition of freshness and will be preserved in the latter wholesome condition for an indefinite period of time.

My novel device is obviously adapted to be used to advantage in boarding-houses and restaurants as well as at carnivals and the like where vendors dispose of sandwiches of various kinds.

Notwithstanding the practical advantages ascribed to my novel device, it will be appreciated that the device is simple and inexpensive in construction and is well adapted to withstand rough usage.

I have specifically described the preferred embodiment of my invention in order to impart an exact understanding of said embodiment. I do not desire, however, to be understood as confining myself to the specific construction shown and described inasmuch as my invention is defined by my appended claim and within the scope of said claim changes or modifications may be made without departure from my invention.

Having described my invention, what I claim and desire to secure by Letters-Patent, is:—

A warming device for pastry comprising a rectangular body, a false bottom arranged in the body and spaced from the true bottom thereof, said false bottom being formed with a centrally disposed aperture, a conical foraminous spreader superimposed upon the false bottom with the apex thereof disposed above said aperture, a flanged foraminous platform superimposed on the false bottom and being elevated therefrom by its flange engaging the latter, and said flanged foraminous platform being arranged over said spreader, a two part cover for the body and one of said parts being movable for access thereto and means for introducing water between the bottoms.

In testimony whereof I affix my signature.

GEORGE H. WALKER.